United States Patent
Uematsu et al.

(10) Patent No.: US 12,442,987 B2
(45) Date of Patent: Oct. 14, 2025

(54) BRANCH RATIO MEASURING DEVICE, BRANCH RATIO MEASURING METHOD, AND OPTICAL MULTIPLEXING/DEMULTIPLEXING CIRCUIT MANUFACTURING METHOD

(71) Applicant: NTT, Inc., Tokyo (JP)

(72) Inventors: Takui Uematsu, Musashino (JP); Hidenobu Hirota, Musashino (JP); Hiroyuki Iida, Musashino (JP)

(73) Assignee: NTT, Inc., Tokyo (JP)

( * ) Notice: Subject to any disclaimer, the term of this patent is extended or adjusted under 35 U.S.C. 154(b) by 275 days.

(21) Appl. No.: 18/020,557

(22) PCT Filed: Aug. 12, 2020

(86) PCT No.: PCT/JP2020/030724
§ 371 (c)(1),
(2) Date: Feb. 9, 2023

(87) PCT Pub. No.: WO2022/034660
PCT Pub. Date: Feb. 17, 2022

(65) Prior Publication Data
US 2023/0324623 A1    Oct. 12, 2023

(51) Int. Cl.
*G02B 6/35* (2006.01)
*G02B 6/26* (2006.01)
*G02B 6/293* (2006.01)

(52) U.S. Cl.
CPC ........... *G02B 6/3594* (2013.01); *G02B 6/262* (2013.01); *G02B 6/2938* (2013.01); *G02B 6/3588* (2013.01)

(58) Field of Classification Search
CPC .... G02B 6/3594; G02B 6/262; G02B 6/2938; G02B 6/3588
See application file for complete search history.

(56) References Cited

U.S. PATENT DOCUMENTS

| | | | | |
|---|---|---|---|---|
| 4,307,933 A | * | 12/1981 | Palmer | G02B 6/283 385/24 |
| 4,737,007 A | * | 4/1988 | Alferness | G02B 6/29334 385/37 |
| 5,187,760 A | * | 2/1993 | Huber | H01S 3/06754 372/6 |
| 5,457,758 A | * | 10/1995 | Snitzer | G02F 1/3132 372/6 |

(Continued)

FOREIGN PATENT DOCUMENTS

| | | | | |
|---|---|---|---|---|
| EP | 0454113 B1 | * | 3/1997 | |
| FR | 2804507 A1 | * | 8/2001 | ........ G01M 11/3154 |

(Continued)

OTHER PUBLICATIONS

Bajić et al., Monitoring of the laser wavelength in modern fiber-optic communication systems using dual photodetectors. Opt Quant Electron 48, 333 (2016). https://doi.org/10.1007/s11082-016-0606-y (Year: 2016).*

(Continued)

*Primary Examiner* — Peter Radkowski
(74) *Attorney, Agent, or Firm* — Harness, Dickey & Pierce, P.L.C.

(57) ABSTRACT

The present disclosure is to provide a branch ratio measuring device, a branch ratio measuring method, and an optical multiplexer/demultiplexer circuit manufacturing method that do not require any optical sources for measurement.
A branch ratio measuring device according to the present disclosure includes: an optical waveguide that has a cladding polished to the core or to the vicinity of the core; a first optical intensity measurement unit that is connected to one end of the core of the optical waveguide, and measures an optical intensity; and a second optical intensity measurement unit that is connected to the other end of the core of the optical waveguide, and measures an optical intensity.

6 Claims, 3 Drawing Sheets

(56) References Cited

U.S. PATENT DOCUMENTS

| | | | | |
|---|---|---|---|---|
| 5,550,940 | A * | 8/1996 | Vengsarkar | G02B 6/02095 385/28 |
| 5,764,831 | A * | 6/1998 | Lauzon | G02B 6/29334 385/39 |
| 5,978,530 | A * | 11/1999 | Russell | G02B 6/29334 385/28 |
| 6,011,881 | A * | 1/2000 | Moslehi | G02F 1/011 385/10 |
| 6,430,341 | B1 * | 8/2002 | Russell | G02B 6/2938 385/27 |
| 6,516,131 | B1 * | 2/2003 | Tullis | G02B 6/3636 385/65 |
| 7,146,077 | B2 * | 12/2006 | Kim | H01S 5/0687 398/94 |
| 10,330,866 | B2 * | 6/2019 | Schade | G02B 6/12007 |
| 2004/0101249 | A1 * | 5/2004 | Tseng | G02B 6/2821 385/37 |
| 2005/0018970 | A1 * | 1/2005 | Tseng | G02B 6/262 385/14 |

FOREIGN PATENT DOCUMENTS

| | | | |
|---|---|---|---|
| JP | 11271178 | A * | 10/1999 |
| JP | 2006170976 | A * | 6/2006 |

OTHER PUBLICATIONS

Dickinson et al., Properties of the fiber reflection Mach-Zehnder interferometer with identical couplers, Opt. Lett. 17, 1192-1194 (1992) (Year: 1992).*

Jackson, D.A., Monomode optical fibre interferometers for precision measurement, 1985 J. Phys. E: Sci. Instrum. 18 981 (Year: 1985).*

Tran et al., A Robust Method for Characterization of Optical Waveguides and Couplers, in IEEE Photonics Technology Letters, vol. 28, No. 14, pp. 1517-1520, Jul. 15, 15, 2016, doi: 10.1109/LPT.2016.2556713. (Year: 2016).*

Zhang, Jian, Optical side-polished fiber coupler: design and fabrication, Thesis, Concordia University, 2006 (Year: 2006).*

Zhang et al., In-line reflective Mach-Zehnder interferometer based on a tilted in-fiber beam splitter, Opt. Lett. 44, 803-806 (2019) (Year: 2019).*

Uematsu et al., "Study on optical fiber coupler using side-polishing method", IEICE Technical Report, vol. 119, No. 223, OFT2019-36, pp. 23-26, Oct. 2019 with machine translated English translation thereof.

* cited by examiner

BRANCH RATIO MEASURING DEVICE, BRANCH RATIO MEASURING METHOD, AND OPTICAL MULTIPLEXING/DEMULTIPLEXING CIRCUIT MANUFACTURING METHOD

CROSS-REFERENCE TO RELATED APPLICATIONS

This application is a 371 U.S. National Phase of International Application No. PCT/JP2020/030724, filed on Aug. 12, 2020. The entire disclosure of the above application is incorporated herein by reference.

TECHNICAL FIELD

The present disclosure relates to a branch ratio measuring device for an optical multiplexer/demultiplexer circuit, a branch ratio measuring method, and an optical multiplexer/demultiplexer circuit manufacturing method, using optical coupling.

BACKGROUND ART

There is a demand for an optical multiplexer/demultiplexer circuit capable of demultiplexing light from an active optical fiber core wire, and multiplexing light into the active optical fiber core wire, without cutting the active optical fiber core wire. For this purpose, a method for manufacturing an optical fiber coupler using a side-polishing method has been studied as a technique for multiplexing and demultiplexing light into and from an active optical fiber core wire without cutting the active optical fiber core wire (see Non Patent Literature 1, for example).

The optical fiber coupler manufacturing method disclosed in Non Patent Literature 1 includes the following steps.

(1) An active optical fiber core wire is housed and fixed into a groove formed in a block having the groove designed for fitting an active optical fiber core wire therein, the coating and the cladding are polished with the side surface of the active optical fiber core wire polished to a portion several μm apart from the core or to the core.

(2) The coating and the cladding are polished with the side surface of an optical waveguide, designed for an optical multiplexer/demultiplexer circuit and buried beforehand in the block, polished to a portion several μm apart from the core or to the core.

(3) The polished surface of the optical fiber core wire that has the coating and the cladding polished to the portion several μm apart from the core or to the core, and the polished surface of the optical waveguide that has the coating and the cladding polished to the portion several μm apart from the core or to the core are put on each other, and the optical fiber core wire and/or the optical waveguide is moved in the plane of the polished surfaces, and is fixed at a position where a desired branch ratio is obtained.

CITATION LIST

Non Patent Literature

Non Patent Literature 1: Uematsu et al., "Study on optical fiber coupler using side-polishing method", IEICE Technical Report, vol. 119, no. 223, OFT2019-36, pp. 23-26, October 2019.

SUMMARY OF INVENTION

Technical Problem

The optical multiplexer/demultiplexer circuit manufacturing method disclosed in Non Patent Literature 1 is now described with reference to FIG. 1. In FIG. 1, reference numeral 21 indicates an optical line terminating device (OLT: Optical Line Terminal), reference numeral 22 indicates an active optical fiber core wire, reference numeral 23 indicates a side-polished optical fiber core wire, reference numeral 24 indicates an optical source (OS: Optical Source), reference numeral 25 indicates a polished optical waveguide, reference numeral 26 indicates an optical coupling region, and reference numeral 27 indicates an optical intensity measurement unit (OP: Optical Power meter). The side-polished optical fiber core wire 23 and the polished optical waveguide 25 constitute an optical multiplexer/demultiplexer circuit in which the optical coupling region 26 is formed.

In FIG. 1, the optical line terminating device 21 transmits and receives signal light through the active optical fiber core wire 22. The polished surface of the side-polished active optical fiber core wire 22 and the polished surface of the polished optical waveguide 25 are put on each other, to form the optical coupling region 26. Light having an optical intensity Pin is injected from the optical source 24 to one end of the polished optical waveguide 25, and a light intensity Pth is measured by the optical intensity measurement unit 27 connected to the other end of the polished optical waveguide 25.

Non Patent Literature 1 suggests a method for estimating a branch ratio of an optical multiplexer/demultiplexer circuit by calculating S=1−Pth/Pin.

However, to inject light having the optical intensity Pin, this method requires the optical source 24 designed for measurement.

Therefore, the present disclosure aims to provide a branch ratio measuring device, a branch ratio measuring method, and an optical multiplexer/demultiplexer circuit manufacturing method that do not require any optical sources for measurement.

Solution to Problem

To achieve the above objective, the present disclosure provides a branch ratio measuring device, a branch ratio measuring method, and an optical multiplexer/demultiplexer circuit manufacturing method that use reflection at one end of a polished optical waveguide.

Specifically, a branch ratio measuring device according to the present disclosure includes:
an optical waveguide that has a cladding polished to the core or to the vicinity of the core;
a first optical intensity measurement unit that is connected to one end of the core of the optical waveguide, and measures an optical intensity; and
a second optical intensity measurement unit that is connected to the other end of the core of the optical waveguide, and measures an optical intensity.

Specifically, a branch ratio measuring method according to the present disclosure includes:
a step of setting a polished surface of an active optical fiber core wire and a polished surface of an optical waveguide being put on each other, the active optical fiber core wire having a cladding side-polished to a core or to a vicinity of the core, the optical waveguide having a cladding polished to a core or to a vicinity of the core;

a step of measuring an optical intensity of an optical signal outgoing from one end of the optical waveguide and an optical intensity of an optical signal reflected on the one end of the optical waveguide and outgoing from the other end of the optical waveguide, the optical signals being included in optical signals that have propagated through the active optical fiber core wire, been demultiplexed by optical coupling, and been partially outgoing from the one end of the optical waveguide, remaining part thereof being reflected; and a step of calculating a branch ratio from the active optical fiber core wire into the optical waveguide, in accordance with the ratio between the optical intensity of the optical signal outgoing from the one end of the optical waveguide and the optical intensity of the optical signal reflected on the one end of the optical waveguide and outgoing from the other end of the optical waveguide.

Specifically, an optical multiplexer/demultiplexer circuit manufacturing method according to the present disclosure includes:

a step of setting a polished surface of an active optical fiber core wire and a polished surface of an optical waveguide being put on each other, the active optical fiber core wire having a cladding side-polished to a core or to a vicinity of the core, the optical waveguide having a cladding polished to a core or to a vicinity of the core;

a step of measuring an optical intensity of an optical signal outgoing from one end of the optical waveguide and an optical intensity of an optical signal reflected on the one end of the optical waveguide and outgoing from the other end of the optical waveguide, the optical signals being included in optical signals that have propagated through the active optical fiber core wire, been demultiplexed by optical coupling, and been partially outgoing from the one end of the optical waveguide, remaining part thereof being reflected;

a step of calculating the branch ratio from the active optical fiber core wire into the optical waveguide, in accordance with the ratio between the optical intensity of the optical signal outgoing from the one end of the optical waveguide and the optical intensity of the optical signal reflected on the one end of the optical waveguide and outgoing from the other end of the optical waveguide; and a step of fixing the polished surface of the active optical fiber core wire and the polished surface of the optical waveguide to each other, on condition of the branch ratio calculated as a desired value.

Advantageous Effects of Invention

According to the present disclosure, it is possible to provide a branch ratio measuring device, a branch ratio measuring method, and an optical multiplexer/demultiplexer circuit manufacturing method that do not require any optical sources for measurement.

DESCRIPTION OF EMBODIMENTS

Figure 1:
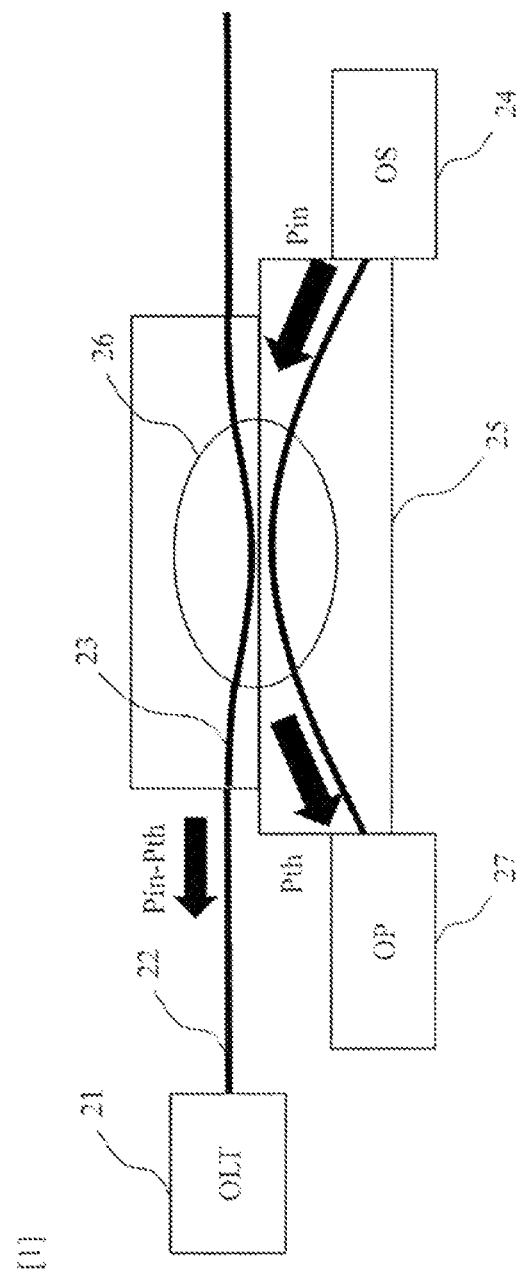
FIG. 1 is a diagram for explaining a relevant method for manufacturing an optical multiplexer/demultiplexer circuit.

The following is a detailed description of embodiments of the present disclosure, with reference to the drawings. Note that the present disclosure is not limited to the embodiments described below. These embodiments are merely examples, and the present disclosure can be carried out in forms with various modifications and improvements based on the knowledge of those skilled in the art. Note that like components are denoted by like reference numerals in this specification and the drawings.

First Embodiment

Figure 2:
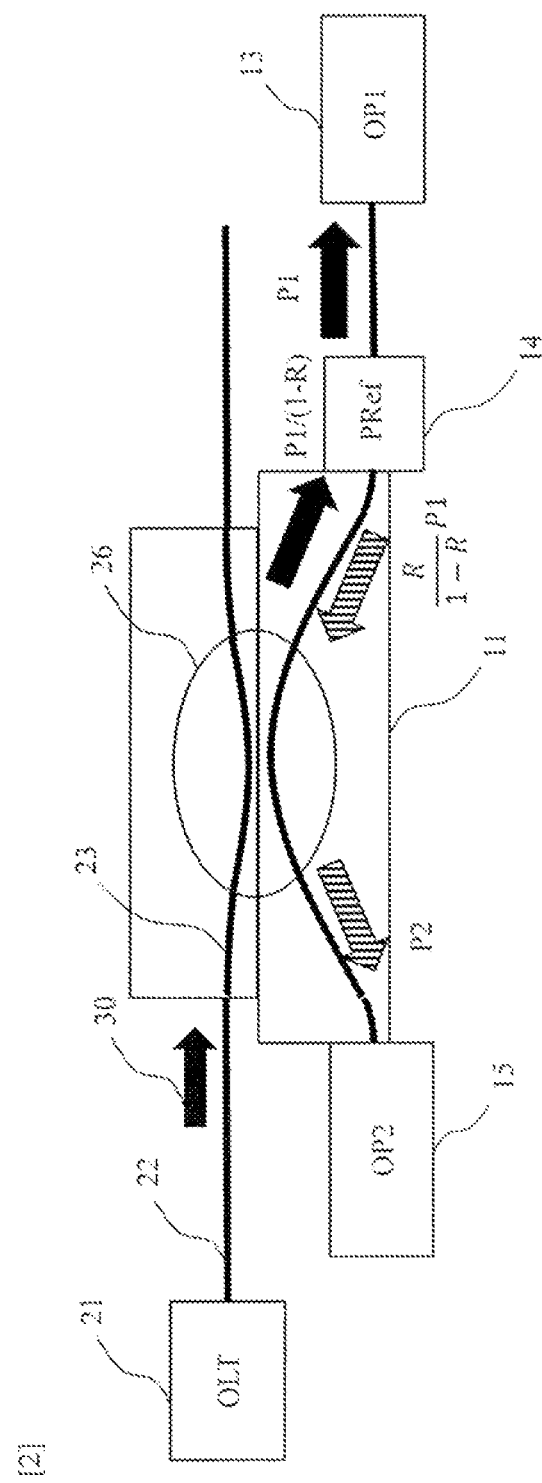
FIG. 2 is a diagram for explaining a branch ratio measuring device of an optical multiplexer/demultiplexer circuit and a branch ratio measuring method according to the present disclosure.

An example configuration of a branch ratio measuring device is illustrated in FIG. 2. In FIG. 2, reference numeral 11 indicates a polished optical waveguide, reference numeral 13 indicates a first optical intensity measurement unit (OP1: Optical Power meter #1), reference numeral 14 indicates a partial reflection unit (PRef: Partial Reflector), reference numeral 15 indicates a second optical intensity measurement unit (OP2: Optical Power meter #2), reference numeral 21 indicates an optical line terminating device (OLT: Optical Line Terminal), reference numeral 22 indicates an active optical fiber core wire, reference numeral 23 indicates a side-polished optical fiber core wire, reference numeral 26 indicates an optical coupling region, and reference numeral 30 indicates communication light.

The branch ratio measuring device according to the present disclosure includes the polished optical waveguide 11, the first optical intensity measurement unit 13, the partial reflection unit 14, and the second optical intensity measurement unit 15. In the polished optical waveguide 11, the cladding is polished to the core or to the vicinity of the core. The polished optical waveguide 11 may be obtained by polishing an optical waveguide of an optical fiber core wire polished to the core or to the vicinity of the core, or may be obtained by polishing an optical waveguide of a planar lightwave circuit (PLC) polished to the core or to the vicinity of the core. The partial reflection unit 14 is connected to one end of the polished optical waveguide 11, reflects part of light at a reflectance R, and transmits the rest of the light. The first optical intensity measurement unit 13 is connected to the partial reflection unit 14. The communication light 30 is optically coupled in the optical coupling region 26, and is outgoing to one end of the polished optical waveguide 11. Part of the communication light 30 is then transmitted through the partial reflection unit 14, and the optical intensity thereof is measured by the first optical intensity measurement unit 13. The second optical intensity measurement unit 15 is connected to the other end of the polished optical waveguide 11. The rest of the communication light 30 reflected by the partial reflection unit 14 is outgoing from the other end of the polished optical waveguide 11, and the optical intensity thereof is measured by the second optical intensity measurement unit 15.

The partial reflection unit 14 may not be necessarily equipment but an end face being one end of the core of the optical waveguide 11 polished almost perpendicularly to the long axis direction. This end face may be a reflecting surface formed by a refractive index difference with the air. Given that the refractive index of the core of the polished optical waveguide 11 is 1.5, the reflectance R is 0.04.

With such a branch ratio measuring device, it is possible to measure the branch ratio of an optical multiplexer/demultiplexer circuit by setting the polished surface of the polished optical waveguide being put on the polished surface of the optical fiber core wire having its cladding side-polished to the core or to the vicinity of the core.

The branch ratio measuring device may further include the optical fiber core wire 23 having its cladding side-polished to the core or to the vicinity of the core. By setting the polished surface of the polished optical waveguide 11 and the polished surface of the side-polished optical fiber core wire 23 being put on each other, the optical coupling region 26 can be formed, and the branch ratio of an optical multiplexer/demultiplexer circuit can be measured.

A method for measuring a branch ratio of an optical multiplexer/demultiplexer circuit with the branch ratio measuring device according to the present disclosure is now described with reference to FIG. 2. The branch ratio measuring method is implemented through the following steps.

(1) The polished surface of the optical fiber core wire 23 having its cladding side-polished to the core or to the vicinity of the core of the active optical fiber core wire 22 is put on the polished surface of the optical waveguide 11 having its cladding polished to the core or to the vicinity of the core.

(2) The first optical intensity measurement unit 13 measures the optical intensity of an optical signal that has propagated through the active optical fiber core wire 22, been demultiplexed by optical coupling in the optical coupling region 26, been outgoing from one end of the polished optical waveguide 11, and passed through the partial reflection unit 14. Also, the second optical intensity measurement unit 15 measures the optical intensity of the optical signal that has been reflected by the partial reflection unit 14, and been outgoing from the other end of the polished optical waveguide 11.

(3) In accordance with the ratio between the optical intensity measured by the first optical intensity measurement unit 13 and the optical intensity measured by the second optical intensity measurement unit 15, the branch ratio from the active optical fiber core wire 22 into the polished optical waveguide 11 is calculated.

The specific calculation of the branch ratio is as follows. Given that the optical intensity of an optical signal from the polished optical waveguide 11 is P1/(1−R), the optical intensity of the optical signal measured by the first optical intensity measurement unit is P1, and the optical intensity of the optical signal reflected by the partial reflection unit 14 is (R/(1−R))P1. Here, R represents the reflectance of the partial reflection unit 14.

Where the optical intensity of the optical signal measured by the second optical intensity measurement unit 15 is P2, the branch ratio S in the optical multiplexer/demultiplexer circuit can be estimated according to Equation (1) shown below.

$$S = 1 - ((1-R)/R)(P2/P1) \quad (1)$$

An optical multiplexer/demultiplexer circuit manufacturing method using the branch ratio measuring device according to the present disclosure is now described with reference to FIG. 2. The optical multiplexer/demultiplexer circuit manufacturing method is implemented through the following steps. Steps (1) to (3) according to the branch ratio measuring method are common to this manufacturing method. After step (3), (4) on condition of the branch ratio calculated as a desired value, the polished surfaces of the side-polished optical fiber core wire 23 and the polished optical waveguide 11 are fixed to each other. When the calculated branch ratio is not a desired value, the side-polished optical fiber core wire 23 or the polished optical waveguide 11 is moved in the plane of the polished surfaces, in the plane of the polished surfaces, and the operation is repeated starting from step (2).

The method for calculating the branch ratio of an optical multiplexer/demultiplexer circuit is as described above. To fix the polished surfaces to each other, the polishing surfaces may be fixed with an adhesive or may be fixed with a clip.

As described above, with the branch measuring device or the branch ratio measuring method according to the present disclosure, it is possible to perform branch ratio measurement without any optical sources. By the optical multiplexer/demultiplexer circuit manufacturing method according to the present disclosure, it is possible to manufacture an optical multiplexer/demultiplexer circuit that does not require any optical sources for measurement.

Second Embodiment

Figure 3:
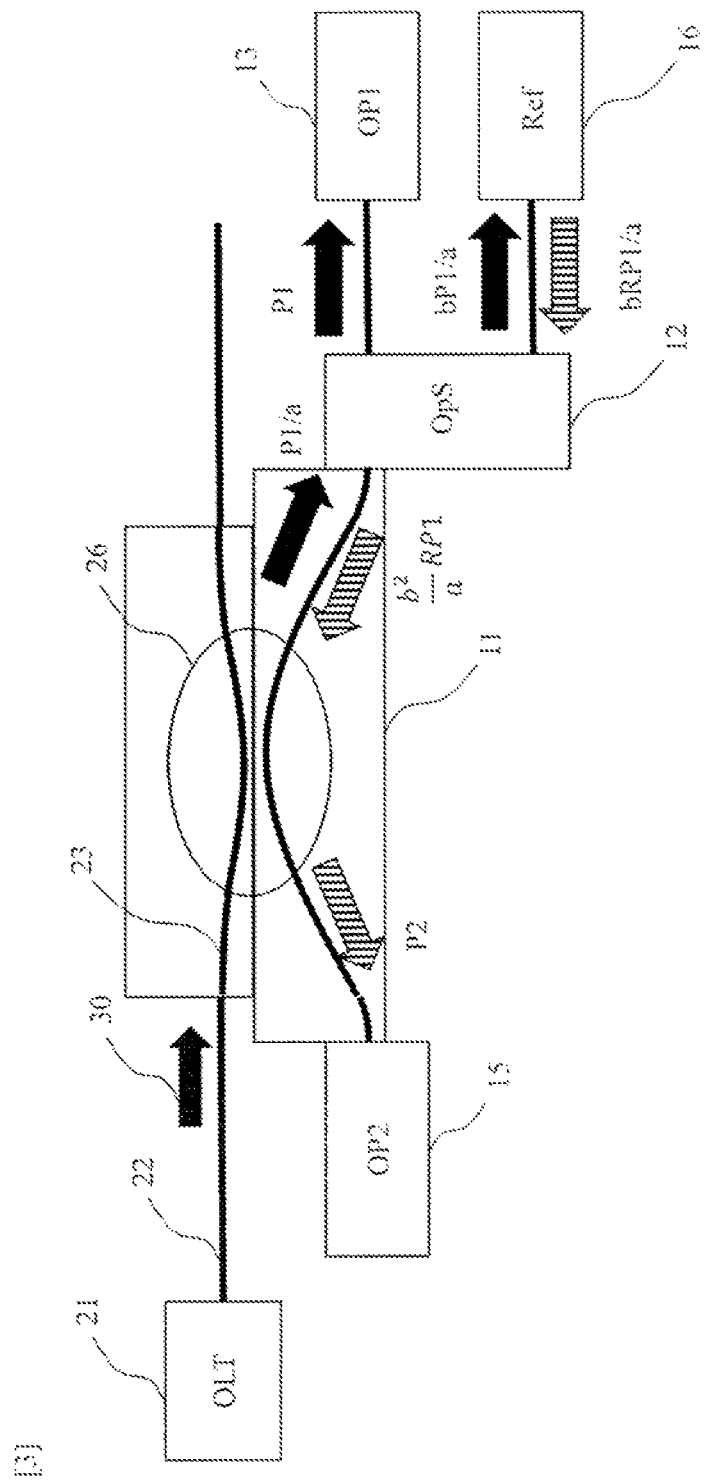
FIG. 3 is a diagram for explaining a branch ratio measuring device of an optical multiplexer/demultiplexer circuit and a branch ratio measuring method according to the present disclosure.

An example configuration of a branch ratio measuring device is illustrated in FIG. 3. In FIG. 3, reference numeral 11 indicates a polished optical waveguide, reference numeral 12 indicates an optical branching unit (OpS: Optical Splitter), reference numeral 13 indicates a first optical intensity measurement unit (OP1: Optical Power meter #1), reference numeral 15 indicates a second optical intensity measurement unit (OP2: Optical Power meter #2), reference numeral 16 indicates a reflection unit (Ref: Reflector), reference numeral 21 indicates an optical line terminating device (OLT: Optical Line Terminal), reference numeral 22 indicates an active optical fiber core wire, reference numeral 23 indicates a side-polished optical fiber core wire, reference numeral 26 indicates an optical coupling region, and reference numeral 30 indicates communication light.

The branch ratio measuring device according to the present disclosure includes the polished optical waveguide 11, the optical branching unit 12, the first optical intensity measurement unit 13, the second optical intensity measurement unit 15, and the reflection unit 16. In the polished optical waveguide 11, the cladding is polished to the core or to the vicinity of the core. The polished optical waveguide 11 may be obtained by polishing an optical waveguide of an optical fiber core wire polished to the core or to the vicinity of the core, or may be obtained by polishing an optical waveguide of a planar lightwave circuit (PLC) polished to the core or to the vicinity of the core. The optical branching unit 12 is connected to one end of the polished optical waveguide 11, and gets light from one end of the polished optical waveguide 11 to branch out into one end and the other end. The first optical intensity measurement unit 13 is connected to one end of the optical branching unit 12. The communication light 30 is optically coupled in the optical coupling region 26, and is outgoing from one end of the polished optical waveguide 11. The communication light 30 is then split by the optical branching unit 12, and an optical intensity of a part thereof is measured by the first optical intensity measurement unit 13. The reflection unit 16 is connected to the other end of the optical branching unit 12. The communication light 30 is optically coupled in the optical coupling region 26, is split by the optical branching unit 12, and a remaining part thereof is reflected by the reflection unit 16 at a reflectance R. The second optical intensity measurement unit 15 is connected to the other end of the polished optical waveguide 11. The communication light reflected by the reflection unit 16 is outgoing to the other end of the polished optical waveguide 11 through the optical branching unit 12, and the optical intensity thereof is measured by the second optical intensity measurement unit 15.

The reflection unit 16 may not be necessarily equipment but an end face being one end of the core of the optical branching unit 12 polished almost perpendicularly to the long axis direction. This end face may be a reflecting surface formed by a refractive index difference with the air. Given that the refractive index of the core of the optical branching unit 12 is 1.5, the reflectance R is 0.04.

With such a branch ratio measuring device, it is possible to measure the branch ratio of an optical multiplexer/demultiplexer circuit by setting the polished surface of the polished optical waveguide being put on the polished surface of the optical fiber core wire having its cladding side-polished to the core or to the vicinity of the core.

The branch ratio measuring device may further include the optical fiber core wire 23 having its cladding side-polished to the core or to the vicinity of the core. By setting the polished surface of the polished optical waveguide 11 and the polished surface of the side-polished optical fiber core wire 23 being put on each other, the optical coupling region 26 can be formed, and the branch ratio of an optical multiplexer/demultiplexer circuit can be measured.

A method for measuring a branch ratio of an optical multiplexer/demultiplexer circuit with the branch ratio measuring device according to the present disclosure is now described with reference to FIG. 3. The branch ratio measuring method is implemented through the following steps.

(1) The polished surface of the optical fiber core wire 23 having its cladding side-polished to the core or to the vicinity of the core of the active optical fiber core wire 22 is put on the polished surface of the optical waveguide 11 having its cladding polished to the core or to the vicinity of the core.

(2) The first optical intensity measurement unit 13 measures the optical intensity of an optical signal that has propagated through the active optical fiber core wire 22, been demultiplexed by optical coupling in the optical coupling region 26, been outgoing from one end of the polished optical waveguide 11, and been split by the optical branching unit 12. Also, the second optical intensity measurement unit 15 measures the optical intensity of the optical signal that has been split by the optical branching unit 12, been reflected by the reflection unit 16, and been outgoing from the other end of the polished optical waveguide 11.

(3) In accordance with the ratio between the optical intensity measured by the first optical intensity measurement unit 13 and the optical intensity measured by the second optical intensity measurement unit 15, the branch ratio from the active optical fiber core wire 22 into the polished optical waveguide 11 is calculated.

The specific calculation of the branch ratio is as follows. Given that the optical intensity of an optical signal from the polished optical waveguide 11 is P1/a, the optical intensity of the optical signal measured by the first optical intensity measurement unit is P1, and the optical intensity of the optical signal injected to the reflection unit 16 is bP1/a. The optical intensity of the optical signal reflected by the reflection unit 16 is bRP1/a, and the optical intensity of the optical signal injected to the polished optical waveguide 11 through the optical branching unit 12 is $(b^2/a)$ RP1. Here, a and b(a+b=1) represents the branch ratio of the optical branching unit 12, and R represents the reflectance of the reflection unit 16.

Where the optical intensity of the optical signal measured by the second optical intensity measurement unit 15 is P2, the branch ratio S in the optical multiplexer/demultiplexer circuit can be estimated according to Equation (2) shown below.

$$S=1-(a/b^2)(P2/(RP1)) \qquad (2)$$

An optical multiplexer/demultiplexer circuit manufacturing method using the branch ratio measuring device according to the present disclosure is now described with reference to FIG. 2. The optical multiplexer/demultiplexer circuit manufacturing method is implemented through the following steps. Steps (1) to (3) according to the branch ratio measuring method are common to this manufacturing method. After step (3), (4) on condition of the branch ratio calculated as a desired value, the polished surfaces of the side-polished optical fiber core wire 23 and the polished optical waveguide 11 are fixed to each other. When the calculated branch ratio is not a desired value, the side-polished optical fiber core wire 23 or the polished optical waveguide 11 is moved in the plane of the polished surfaces, in the plane of the polished surfaces, and the operation is repeated starting from step (2).

The method for calculating the branch ratio of an optical multiplexer/demultiplexer circuit is as described above. To fix the polished surfaces to each other, the polishing surfaces may be fixed with an adhesive or may be fixed with a clip.

As described above, with the branch measuring device or the branch ratio measuring method according to the present disclosure, it is possible to perform branch ratio measurement without any optical sources. By the optical multiplexer/demultiplexer circuit manufacturing method according to the present disclosure, it is possible to manufacture an optical multiplexer/demultiplexer circuit that does not require any optical sources for measurement.

INDUSTRIAL APPLICABILITY

The present disclosure can be applied in information and communication industries.

REFERENCE SIGNS LIST 11 polished optical waveguide
12 optical branching unit (OpS)
13 first optical intensity measurement unit (OP1)
14 partial reflection unit (PRef)
15 second optical intensity measurement unit (OP2)
16 reflection unit (Ref)
21 optical line terminating device (OLT)
22 active optical fiber core wire
23 side-polished optical fiber core wire
24 optical source (OS)
25 polished optical waveguide
26 optical coupling region
27 optical intensity measurement unit (OP)
30 communication light

The invention claimed is:
1. A branch ratio measuring device comprising:
an optical waveguide that has a cladding polished to a core or to a vicinity of the core, where the optical waveguide is configured to receive incoming light at one end of the core and output light at the other end of the core;

a first optical intensity measurement unit that is connected to one end of the core of the optical waveguide, and measures an optical intensity;

a second optical intensity measurement unit that is connected to the other end of the core of the optical waveguide, and measures an optical intensity; and a partial reflection unit that is disposed between the other end of the core of the optical waveguide and the second optical intensity measurement unit, reflects part of light, and transmits remaining part of the light, wherein the second optical intensity measurement unit measures an optical intensity of the light that has passed through the partial reflection unit.

2. The branch ratio measuring device according to claim 1, further comprising an optical fiber core wire that has a cladding side-polished to a core or to a vicinity of the core, wherein a polished surface of the optical waveguide and a polished surface of the optical fiber core wire are put on each other, to form an optical coupling region.

3. The branch ratio measuring device according to claim 1, wherein the partial reflection unit is an end face being the one end of the core of the optical waveguide perpendicular to a long axis direction, and being a reflecting surface formed by a refractive index difference with air.

4. The branch ratio measuring device according to claim 1, further comprising:

an optical branching unit that is disposed between the one end of the core of the optical waveguide and the first optical intensity measurement unit, and gets light to branch out into one end and the other end of the optical branching unit; and a reflection unit that is disposed at the other end of the optical branching unit, and has a predetermined reflectance, wherein the first optical intensity measurement unit is connected to the one end of the optical branching unit, and measures an optical intensity of light from the one end of the optical branching unit.

5. A branch ratio measuring method comprising:

a step of setting a polished surface of an active optical fiber core wire and a polished surface of an optical waveguide being put on each other, the active optical fiber core wire having a cladding side-polished to a core or to a vicinity of the core, the optical waveguide having a cladding polished to a core or to a vicinity of the core;

a step of measuring an optical intensity of an optical signal outgoing from one end of the optical waveguide and an optical intensity of an optical signal reflected on the one end of the optical waveguide and outgoing from the other end of the optical waveguide, the optical signals being included in optical signals that have propagated through the active optical fiber core wire, been demultiplexed by optical coupling, and been partially outgoing from the one end of the optical waveguide, remaining part thereof being reflected; and a step of calculating a branch ratio from the active optical fiber core wire into the optical waveguide, in accordance with a ratio between the optical intensity of the optical signal outgoing from the one end of the optical waveguide and the optical intensity of the optical signal reflected on the one end of the optical waveguide and outgoing from the other end of the optical waveguide.

6. An optical multiplexer/demultiplexer circuit manufacturing method comprising:

a step of setting a polished surface of an active optical fiber core wire and a polished surface of an optical waveguide being put on each other, the active optical fiber core wire having a cladding side-polished to a core or to a vicinity of the core, the optical waveguide having a cladding polished to a core or to a vicinity of the core;

a step of measuring an optical intensity of an optical signal outgoing from one end of the optical waveguide and an optical intensity of an optical signal reflected on the one end of the optical waveguide and outgoing from the other end of the optical waveguide, the optical signals being included in optical signals that have propagated through the active optical fiber core wire, been demultiplexed by optical coupling, and been partially outgoing from the one end of the optical waveguide, remaining part thereof being reflected;

a step of calculating a branch ratio from the active optical fiber core wire into the optical waveguide, in accordance with a ratio between the optical intensity of the optical signal outgoing from the one end of the optical waveguide and the optical intensity of the optical signal reflected on the one end of the optical waveguide and outgoing from the other end of the optical waveguide; and a step of fixing the polished surface of the active optical fiber core wire and the polished surface of the optical waveguide to each other, on condition of the branch ratio calculated as a desired value.

* * * * *